Dec. 4, 1928.
J. L. HOSFORD
1,694,011
GEAR SHIFTING LEVER LOCK AND IGNITION SWITCH ACTUATING MECHANISM
Filed March 24, 1927    2 Sheets-Sheet 1
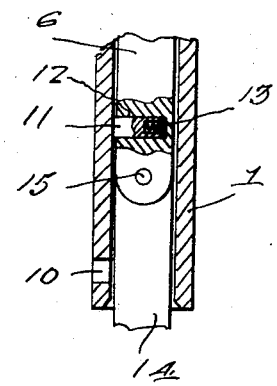
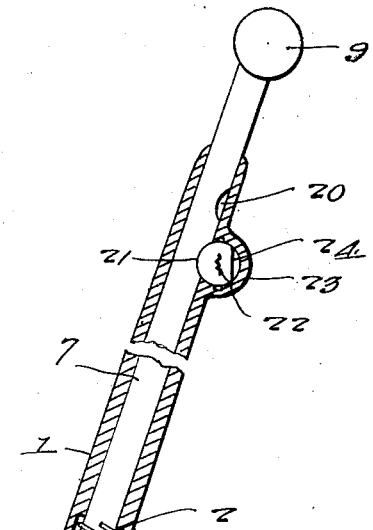
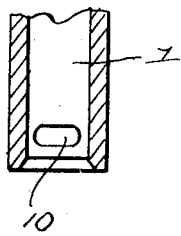
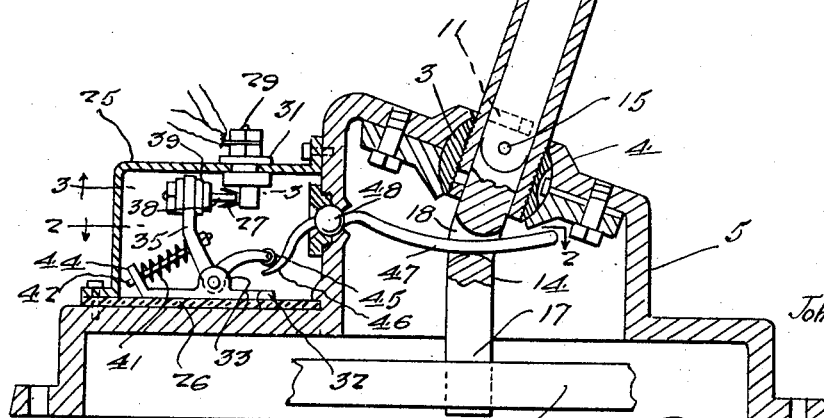
Inventor
John Lester Hosford
By Clarence A. O'Brien
Attorney Dec. 4, 1928.  
J. L. HOSFORD  
1,694,011
GEAR SHIFTING LEVER LOCK AND IGNITION SWITCH ACTUATING MECHANISM
Filed March 24, 1927     2 Sheets-Sheet 2
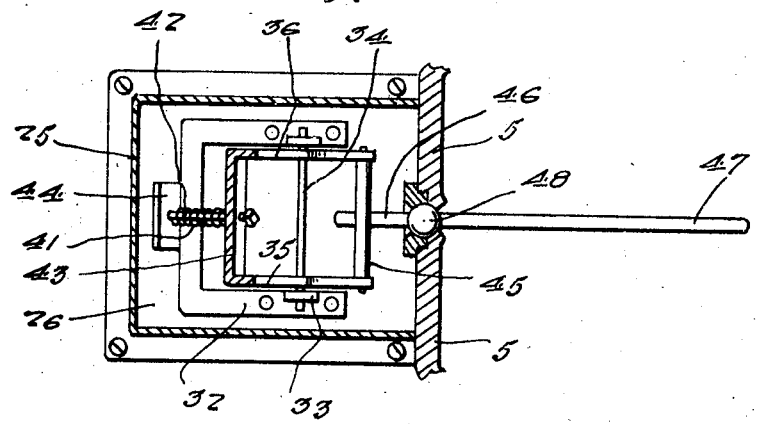
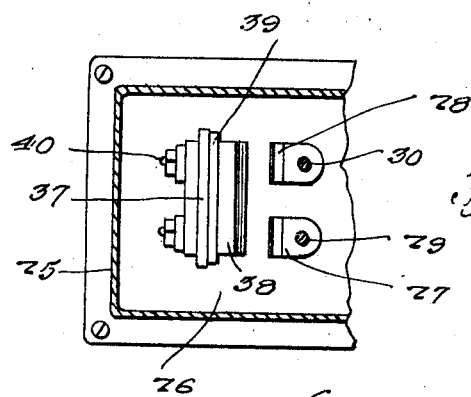
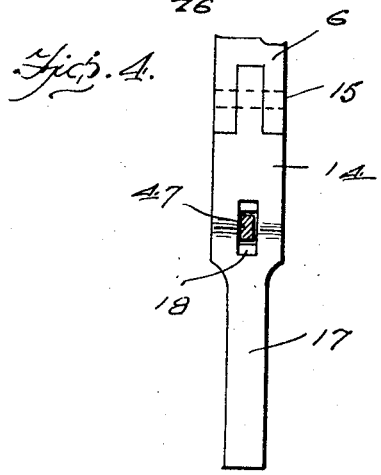
Inventor  
John Lester Hosford
By Clarence A. O'Brien  
Attorney Patented Dec. 4, 1928.

1,694,011

UNITED STATES PATENT OFFICE.

JOHN LESTER HOSFORD, OF BOONVILLE, MISSOURI.

GEAR-SHIFTING-LEVER LOCK AND IGNITION-SWITCH-ACTUATING MECHANISM.

Application filed March 24, 1927. Serial No. 178,045.

The present invention relates to improvements over my prior Patent #1,609,820, December 7, 1926, and my copending application, bearing Serial No. 155,450, filed December 17, 1926.

One of the important objects of the present invention is to provide a gear shifting lever lock, wherein the same is adapted for cooperation with the ignition switch of the motor vehicle, in such a manner as to effect the simultaneous operation of both members, so that the ignition will be cut off simultaneously with the moving of the gear shifting lever to a non-shifting position.

Another important object of the invention is to provide a gear shifting lever lock, wherein the gear shifting lever is of substantially the same type as that embodied in my co-pending application above referred to, means being provided for normally urging the gear shifting lever downwardly in its sleeve, so that the extension carried on the lower end of the lever is moved out of engagement with the sleeve for disposition of the lever in a non-shifting position.

A further and important object of the invention resides in the provision of a means for permanently locking the gear shifting lever in a non-shifting or inoperative position, should the locking means which is normally employed for association with the gear shifting lever become broken.

A further object is to provide a device of the above mentioned character, which is simple in construction, strong and durable and further well adapted to the purpose for which it is designed.

Other objects and advantages of the invention will become apparent during the course of the following detailed description.

In the accompanying drawings, forming a part of this application and in which like reference characters designate like parts throughout the views;

Figure 1 is a detail vertical sectional view through the sleeve and the casing for the ignition switch mechanism, parts of the invention being shown in elevation and in the present instance, the lever is disposed in an operative or shifting position, with the ignition switch in a closed position.

Figure 2 is a sectional view, taken approximately on the line 2—2 of Figure 1, looking downwardly in the direction of the arrows, for more clearly disclosing the circuit closing mechanism of the ignition switch.

Figure 3 is a sectional view, taken approximately on the line 3—3 of Figure 1, looking in the direction of the arrow, for showing the contact forming a part of the ignition switch structure.

Figure 4 is a side elevation of the lower end portion of the gear shifting lever, showing the extension pivoted thereto and also disclosing the manner in which the arm of the circuit closing mechanism is disposed within the slot provided therefor in said extension.

Figure 5 is an enlarged fragmentary detail showing the normal position of the gear shifting lever and its pivoted extension when said lever is locked in a shifting or operative position, and Figure 6 is a fragmentary sectional view of the lower end of the sleeve for more clearly showing a slot formed in the side thereof.

In the drawings, wherein for the purpose of illustration is shown the preferred embodiment of my invention, the numeral 1 designates an elongated sleeve, which tapers gradually toward its upper end, the upper portion of the bore of the sleeve being reduced, whereby to form an annular shoulder 2 in the manner as more clearly shown in Figure 1. The lower end of this sleeve is externally threaded, and supported thereon is the ball shaped head 3, which is adapted for universal movement within the bearing 4 provided therefor in the top of the usual ball joint housing 5 of a vehicle transmission mechanism.

Adapted for slidable longitudinal movement through the elongated vertically disposed sleeve 1, is the gear shifting lever 6. The upper portion of this lever is reduced, as illustrated at 7, and a shoulder 8 is formed at the juncture of the lever with the reduced portion, in the manner as also clearly illustrated in Figure 1. The reduced portion 7 is of a length longer than the reduced bore of the sleeve 1, whereby said shoulders 2 and 8 are spaced with respect to each other. A knob 9 is carried on the upper end of the reduced portion 7 of the lever 6, for the purpose of actuating said lever.

Formed in the side of the lower end of the sleeve 1 is a slot 10, and adapted for cooperation therewith is the sliding spring projected bolt 11, operable within a suitable recess 12, formed in the lower end portion of the lever 6. This bolt is normally urged outwardly of the recess 12 by the action of the spring 13, which is disposed between the inner end of the bolt and the closed end of the recess.

The bolt 11 is normally held out of engagement with the slot 10 formed in the lower end portion of the sleeve 1 and as the lower end of the lever terminates at a point above the slot 10, when said lever is in its shifting or operative position, said bolt will also be disposed above the slot and will not enter the slot only at a predetermined time, as will be hereinafter more fully explained.

A relatively short extension 14 is pivotally secured to the lower end of the lever 6, as at 15, and this particular feature is more fully disclosed in my copending application, bearing Serial No. 155,450. The lower portion of this extension is offset, as indicated at 17, and the lower end of this offset portion is in engagement with the shifting mechanism of the vehicle transmission, designated generally at A, so that said lever 6 will at all times be in engagement with the gear shifting mechanism of the transmission, regardless of the position in which the lever 6 is moved.

A transversely extending slot 18 is formed in the extension at the point where the offset portion extends and as clearly illustrated in Figure 1, this slot or opening 18 is enlarged and the side edges are rounded to provide a bearing, the purpose of which will also be presently apparent.

An expansible coil spring 19 encircles the lower end of the reduced portion 7 of the gear shifting lever 6 and this coil spring is disposed between the spaced shoulders 2 and 8 for normally urging the lever 6 downwardly in the sleeve, so that the pivotal connection between the lower end of the lever and the extension 14 will be disposed below the lower end of the sleeve 2, so that the gear shifting lever cannot operate the gear shifting mechanism of the transmission as has been more fully described in the aforementioned copending application.

The upper portion of the reduced end 7 of the gear shifting lever 6 is formed in its side with a pair of vertically spaced arcuate shaped notches designated by the numerals 20 and 21 respectively, and the side portion of the reduced end 7 between the arcuate shaped notches is planed, so as to be flat, as is fully set out in my prior Patent #1,609,820.

Adapted for cooperation with these spaced arcuate shaped notches is the locking barrel 22, which is rotatably mounted in the lock casing 23, formed on the side of the upper portion of the sleeve and this barrel 22 has one side thereof flattened, for cooperation with the flat face of the gear shifting lever 6 in the manner as also set out in the aforementioned patent.

Manifestly, when the barrel 22 is rotated so that the flat face 24 thereof is in alignment with the bore of the sleeve, the lever 6 may be moved longitudinally and when the rounded portion of the barrel is disposed for engagement with the lowermost arcuate shaped notch 21, the pivoted connection between the lower end of the gear shifting lever 6 and the extension 14 will be disposed inwardly of the lower end of the sleeve, so that a rigid connection between the gear shifting lever 6 and the shifting mechanism of the transmission will be provided, thus permitting the transmission mechanism to be actuated by the lever 6, when the same is operated in the usual manner.

Manifestly, when the rounded portion of the barrel 22 is disposed within the notch 20, the pivoted connection between the lever 6 and the extension 14 will be disposed beyond the lower end of the sleeve, thus permitting the free movement of the lever without affecting the actuation of the shifting mechanism of the transmission.

The distance between the bolt 11 and the slot 10 is slightly greater than the distance between the center portion of the spaced arcuate shaped notches 20 and 21, so that when the lever 6 is moved downwardly in the sleeve 1, and the barrel 22 is engaged with the notch 20, the bolt 11 will still be above the slot. The purpose of the bolt and slot is to provide a means for permanently locking the lever in a lowered inoperative position with respect to the shifting mechanism of the transmission, should the lock 22 become broken and as the spring 19 normally urges the lever 6 downwardly and as soon as the bolt 11 is brought into alignment with the slot 10, the spring 13 will force the bolt 11 outwardly, into locked engagement with the slot.

Also forming an important part of the present invention is the ignition switch control mechanism and the same comprises a casing 25, which is secured to the side of the bolt of the ball joint housing 5. An insulated base 26 is associated with the casing 25, and a pair of spaced contacts 27 and 28 respectively are arranged beneath the top of the casing 25 and extending upwardly from these contacts are the binding posts 29 and 30 respectively, the same being insulated from the casing 25 by the bushings 31. The upper ends of these binding posts provide terminals for connection with the terminal ends of suitable conductor wires associated with the ignition mechanism of the vehicle, in the manner well known in the art, and as this particular connection does not form an important part of the present invention, a detailed description thereof is thought unnecessary.

The switch further includes the provision of a substantially U-shaped frame 32, which is secured to the insulated base 26 in the manner more fully disclosed in Figure 2. A pair of upstanding ears 33 are formed on the forward end portions of the arms of this U-shaped frame and journaled for rotation between these ears is the rod or shaft 34. A pair of bell crank levers 35 and 36 respectively are supported on the shaft 34, adjacent the respective arms of the U-shaped frame 32. A cross bar 37 bridges the upper ends of the vertically extending portions of these bell crank levers and carried by the inner face of this cross bar is the elongated copper strip 38, which is adapted for cooperation with the spaced contacts 27 and 28. This copper strip 38 is insulated from the cross bar 37 by the insulated strip 39, and the copper strip is secured to the cross bar, by means of the bolt 40. This construction is more clearly disclosed in Figure 3 of the drawings.

The copper strip or bar 38 is normally held in engagement with the contacts 27 and 28, so as to close the circuit to the ignition mechanism of the vehicle, through the medium of the expansible coil spring 41, which encircles a bolt 42 extending between a transverse strip 43, supported between the intermediate portions of the vertical arms of the bell crank levers and an upwardly disposed projection 44, at the base portion of the U-shaped frame 42, and this construction is clearly disclosed in Figures 1 and 2 of the drawings.

A roller 45 is supported between the free ends of the horizontally disposed arms of the bell crank levers 35 and 36 and cooperating within this roller is the curved finger 46, formed on the outer end of the elongated curved arm 47, which extends into the ball joint housing 5. This arm 47 is universally associated with the side of the housing 5 adjacent the casing 25 as indicated generally at 48 and the inner end of this arm extends through the slot 18 formed in the extension 14, which is pivotally secured to the lower end of the gear shifting lever 6.

When the parts are arranged as shown in Figure 1 of the drawings, the lever 6 is locked in a shifting or operative position, so that the gears of the transmission mechanism may be shifted in any predetermined manner.

When the lever 6 is in its shifting position, the switch will be maintained in its closed position, as shown in Figure 1, so that the circuit to the ignition system will be normally closed.

When the shifting lever 6 is moved downwardly within the sleeve in the manner as heretofore more fully described, for the purpose of moving the joint 15 outwardly below the lower end of the sleeve so that the lever will be disposed in a non-shifting or inoperative position, simultaneously with the downward movement of the lever and the extension 14, the inner end of the arm 47 will be moved downwardly causing the finger 46 which is in engagement with the roller 45 to raise the roller, thus causing the bell crank levers to swing on their pivots, and as a result of such action, the contact 38 will be moved out of engagement with the contacts 27 and 28, thus breaking the circuit to the ignition system.

When the gear shifting lever 6 is moved into a shifting or operative position, it will simultaneously return the movable elements of the ignition switch to such a position as to cause the circuit to the ignition system to be automatically turned on.

It will thus be seen from the foregoing description that I have provided a novel gear shifting lever lock construction which will insure safety in locking of the vehicle, and which will furthermore cooperate with the circuit closure for the ignition system switch in effecting the opening and closing of the switch simultaneously with the moving of the gear shifting lever to a non-shifting and shifting position respectively.

While I have shown the preferred embodiment of my invention, it is to be understood that various changes in the size, shape and arrangement of parts may be resorted to, without departing from the spirit of the invention or the scope of the appended claims.

What I claim is:

1. In combination, a slidable gear shifting lever, a sleeve through which the lever is slidable, the lower end of the lever being adapted for engagement with the shifting mechanism of the vehicle transmission, a normally closed ignition control switch, means operable by the lever when the latter is moved to a non-shifting position for simultaneously opening said switch, additional means for securing the lever in a shifting or non-shifting position, and means for permanently locking the gear shifting lever in a non-shifting position, when the aforementioned securing means is broken.

2. In combination, a gear shifting lever, a sleeve through which said lever is slidable, the lower end of the sleeve adapted for engagement with the shifting mechanism of a vehicle transmission, a normally closed ignition control switch comprising a casing, a pair of stationary contacts mounted therein, a movable contact normally held in engagement with the stationary contacts, cooperating means between the gear shifting lever and said movable contact member for moving said movable contact member out of engagement with the stationary contact, when said gear shifting lever is moved to a non-shifting position, said means comprising a pivoted arm, one end thereof being in operative engagement with the gear shifting lever, the other end of the arm being operatively connected with the movable contact.

3. In a transmission shifting lever lock, an elongated sleeve universally attached at one end to the transmission casing, a gear shifting lever slidable in the sleeve, an extension pivoted to the lower end of the lever and adapted for engagement with the shifting mechanism of the vehicle transmission, said extension being rigidly connected to the lever when the same is moved upwardly within the sleeve to permit shifting of the gear, said extension being free to swing with respect to the lever when the same is moved entirely out of the lower portion of the sleeve for preventing the shifting of the gears, means for locking the lever in a shifting position, and resilient means associated with the lever for normally urging the same downwardly in the sleeve, to dispose the same in a non-shifting position, when said locking means is open, and additional means for permanently locking the gear shifting lever in a non-shifting position, when the aforementioned locking means is broken.

4. In a transmission shifting lever lock, an elongated sleeve universally attached at one end to the transmission casing, a gear shifting lever slidable in the sleeve, an extension pivoted to the lower end of the lever and adapted for engagement with the shifting mechanism of the vehicle transmission, said extension being rigidly connected to the lever when the same is moved upwardly within the sleeve to permit shifting of the gear, said extension being free to swing with respect to the lever when the same is moved entirely out of the lower portion of the sleeve for preventing the shifting of the gears, means for locking the lever in a shifting position, and resilient means associated with the lever for normally urging the same downwardly in the sleeve, to dispose the same in a non-shifting position, when said locking means is open, and additional means for permanently locking the gear shifting lever in a non-shifting position when the aforementioned locking means is broken.

5. In a transmission shifting lever lock, an elongated sleeve universally attached at one end to the transmission casing, a gear shifting lever slidable in the sleeve, an extension pivoted to the lower end of the lever and adapted for engagement with the shifting mechanism of the vehicle transmission, said extension being rigidly connected to the lever when the same is moved upwardly within the sleeve to permit shifting of the gear, said extension being free to swing with respect to the lever when the same is moved entirely out of the lower portion of the sleeve for preventing the shifting of the gears, means for locking the lever in a shifting position, and resilient means associated with the lever for normally urging the same downwardly in the sleeve, to dispose the same in a non-shifting position, when said locking means is open, and additional means for permanently locking the gear shifting lever in a non-shifting position when the aforementioned locking means is broken, said means comprising a spring pressed bolt arranged in the side of the lower portion of the lever, the lower end of the sleeve being formed with a slot in the side thereof for cooperation with the bolt.

6. In a transmission shifting lever lock, a lever universally connected to the transmission case, and slidable longitudinally with respect thereto, a member pivoted to the inner end of the lever for engagement with the shifting mechanism of the transmission, means for securing the lever in a shifting or non-shifting position, and means for permanently locking the gear shifting lever in a non-shifting position, when the aforementioned securing means is broken.

7. In a transmission shifting lever lock, an elongated sleeve universally mounted at one end in a transmission case, a shifting lever slidable in the sleeve, an extension pivoted to the inner end of the lever and adapted for engagement with the shifting mechanism of the transmission, said extension being rigidly connected to the lever when the same is moved partially within the sleeve so as to facilitate the shifting of the gears, the extension being free to swing with respect to the lever when the same is moved entirely out of the sleeve for preventing the shifting of the gears, means whereby the lever may be rigidly locked in either position, an additional means for permanently locking the gear shifting lever in a non-shifting position when the aforementioned locking means is broken.

In testimony whereof I affix my signature.

JOHN LESTER HOSFORD.